United States Patent [19]
Elings et al.

[11] Patent Number: 5,025,658
[45] Date of Patent: Jun. 25, 1991

[54] COMPACT ATOMIC FORCE MICROSCOPE

[75] Inventors: Virgil B. Elings; John A. Gurley, both of Santa Barbara, Calif.; Dror Sarid, Tucson

[73] Assignee: Digital Instruments, Inc., Santa Barbara, Calif.

[21] Appl. No.: 442,256

[22] Filed: Nov. 28, 1989

[51] Int. Cl.⁵ .............................................. G01B 5/28
[52] U.S. Cl. .................................................... 73/105
[58] Field of Search ................... 73/104, 105; 324/244, 324/260, 261; 250/306; 356/2, 372, 376

[56] References Cited

U.S. PATENT DOCUMENTS

| | | | |
|---|---|---|---|
| H371 | 11/1987 | Bobb | 324/260 |
| 3,049,002 | 8/1962 | Hediger | 73/105 |
| 4,724,318 | 2/1988 | Binnig | 250/306 |
| 4,765,181 | 8/1988 | Numoto et al. | 73/105 |
| 4,887,032 | 12/1989 | Hetrick | 324/260 |

FOREIGN PATENT DOCUMENTS

| | | | |
|---|---|---|---|
| 0212507 | 9/1987 | Japan | 356/376 |
| 1549410 | 8/1979 | United Kingdom | 73/105 |

Primary Examiner—Robert Raevis
Attorney, Agent, or Firm—Donald A. Streck

[57] ABSTRACT

This is an atomic force microscope in which the sensor can be built as a very small integrated structure. The sensor utilizes optical interference and can be operated in either the contact mode for high resolution or in the non-contact mode to measure electric and magnetic fields. One configuration of this microscope is a stand-alone configuration in which the microscope can be placed on or be suspended above large samples for sanning of small local areas thereof. The sensor is built into a scanner so that the sensor can be scanned over a stationary sample.

32 Claims, 5 Drawing Sheets

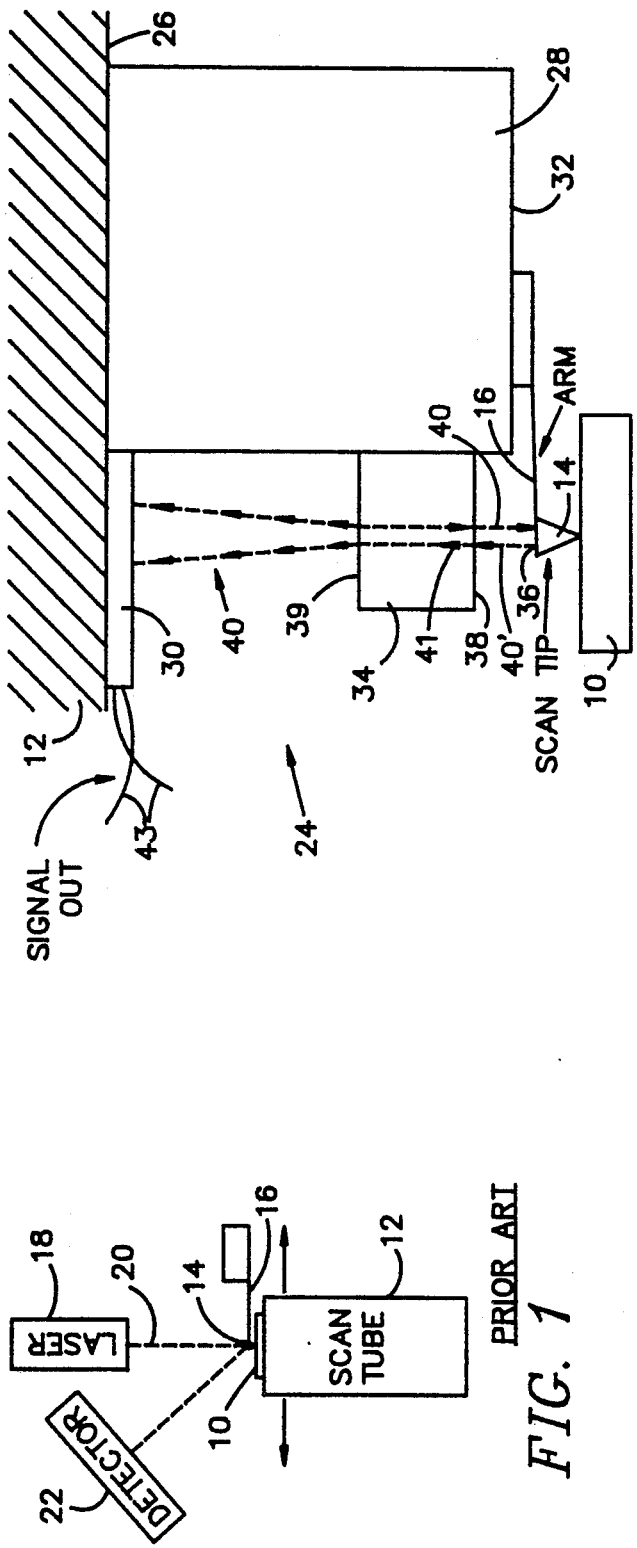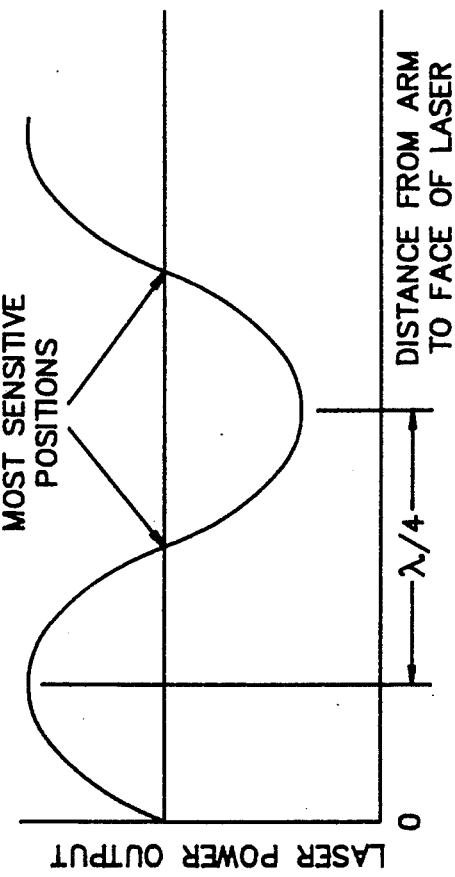

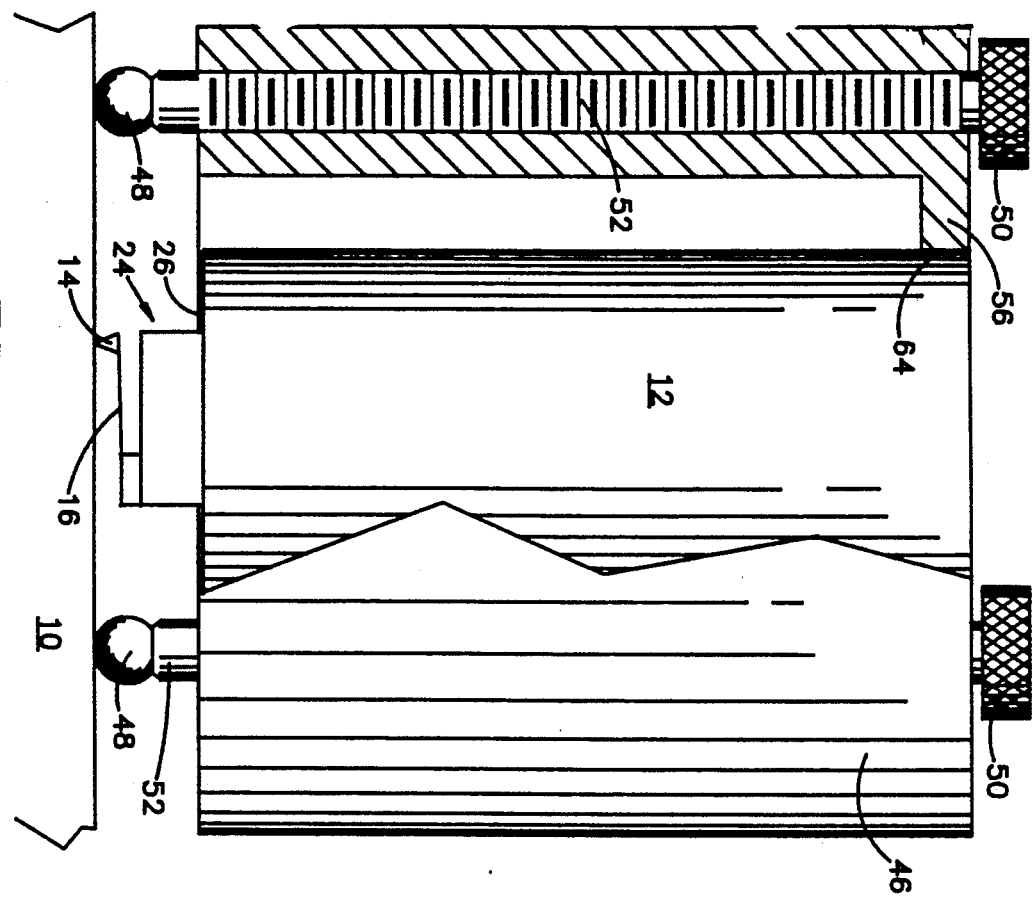
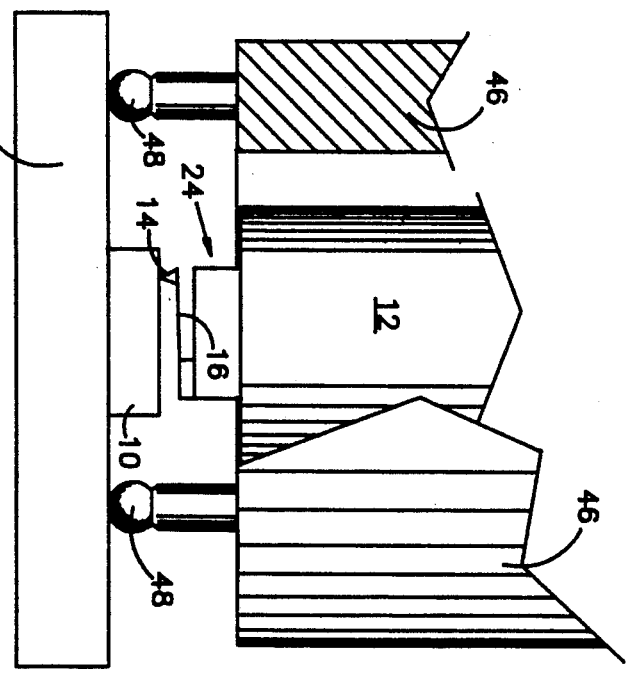

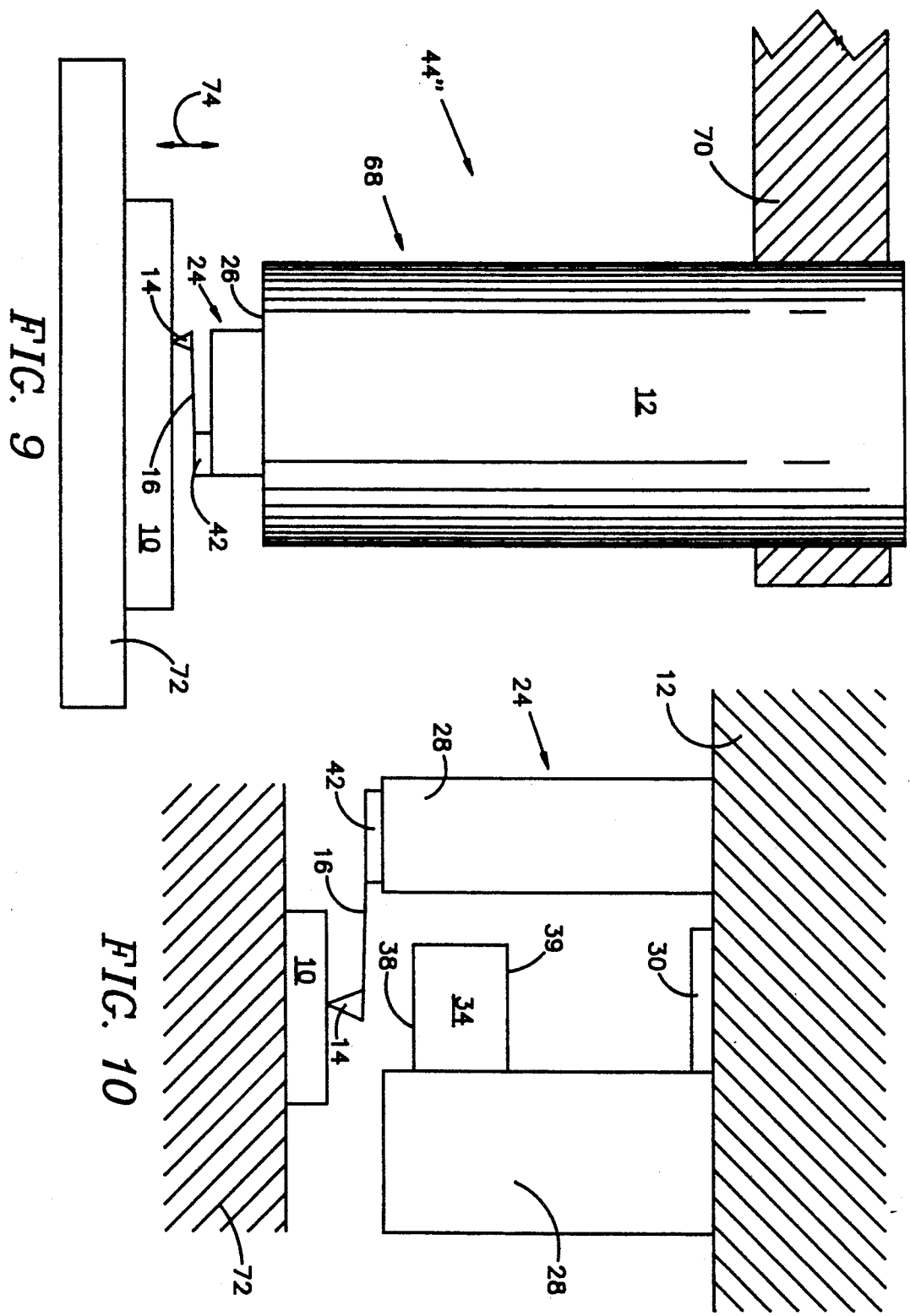

COMPACT ATOMIC FORCE MICROSCOPE

BACKGROUND OF THE INVENTION

This invention relates to atomic force microscopes and, more particularly, in an atomic force microscope having a sensing tip mounted for vertical movement in response to relative horizontal movement of the sensing tip across a sample surface, to the method of manufacture and operation for sensing vertical movement of the sensing tip and for outputting signal reflecting characteristics of the sample surface related to vertical movement of the sensing tip comprising the steps of, applying a reflective surface to move vertically in combination with the sensing tip; mounting a laser diode having light-emitting faces on opposite sides thereof close adjacent the sensing tip with one of the faces facing the reflective surface to emit a laser light beam therefrom and receive a portion of the light beam reflected from the reflective surface thereon; disposing a laser power detector close adjacent and facing the other of the faces of the laser diode to receive a combination of emitted and reflected laser light thereon and output an electrical signal directly related to the power of the laser light; scanning the sensing tip over the sample surface while operating the laser diode; and, receiving the electrical signal from the laser power detector and using data therefrom to determine physical properties of the sample surface.

Atomic force microscopes are essentially surface profilometers which use very sharp tips and very low forces between the tip and sample. They can also operate in a mode in which the force is attractive and the tip does not touch the surface. A typical prior art atomic force microscope is described in U.S. Pat. No. 4,724,318. In this microscope a sharp tip on a flexible lever is held in contact with a surface. The height of the tip is detected by a tunneling microscope and this height measurement is used in a feedback loop to move the lever mount up and down to keep the bending of the lever, and therefore the force on the sample, constant. Subsequently, it has been found that the force exerted by the tunneling microscope on the atomic force tip is large and makes it difficult to operate the device with a low force between the force tip and sample. More suitable sensors of the tip height have been optical either interference or beam deflection. Y. Martin, et al, J. Appl. Phys. 61, 4723, (1987) describes the former while O. Marti, B. Drake, and P. K. Hansma, Appl. Phys. Letters 51,484 (1984) describes the latter in the form of an atomic force microscope in which a beam of light is reflected off the back of the force tip. This typical prior art approach is depicted in FIG. 1. The sample 10 is mounted on the top of a piezoelectric scan tube 12. A scan tip 14 is mounted on the end of a cantilevered arm 16. A laser source 18 directs a laser light beam 20 onto the top of the arm 16 at the tip 14. The sample 10 is positioned under the tip 14 and the piezoelectric scan tube 12 is driven by a voltage which will move the sample 10 in a raster scan movement with respect to the tip 14. As the tip 14 moves up and down in its passages over the surface of the sample 10, the reflected light beam 20 is deflected and this deflection is measured by an optical detector 22. The foregoing system has the ability to measure tip motions with langstrom resolution. Note that in this microscope, the tip cannot be scanned over the sample without scanning the entire optical system along with the tip. Due to the extended nature of the system, because the lever arms need to measure beam deflection, this is not practical; so, in all of the microscopes of this type the sample is scanned across the tip in the manner shown and described above. The sample, therefore, must be small in order to fit on the top of the scan tube. Usually, the samples are limited to being only a few millimeters square. Large samples, such as optical mirrors, cannot be measured with these microscopes, making these microscopes non-useful for many applications. The extended nature of the sensor (i.e. the distance between the source 18 and tip 14 and from the tip 14 to the detector 22) also makes it susceptible to thermal drifts of the structure.

Atomic force microscopes using optical interference have also been made; but, have been used only in a non-contact mode where the tip does not touch the surface. The tip is vibrated near its natural frequency and force gradients caused by the surface change the amplitude of oscillation. A microscope using an optical fiber and an interferometer to detect the position of the tip was described by Y. Martin, et al, J. Appl. Phys. 61,4723 (1987).

Wherefore, it is an object of this invention to provide an atomic force microscope using a laser diode and optical interference of light reflected back into the laser to measure the vertical position of the tip.

It is another object of this invention to provide an atomic force microscope using a laser diode and optical interference of light reflected back into the laser to measure the vertical position of the tip wherein the tip can be either off the surface and vibrated where changes in the amplitude of vibration near the natural frequency of the lever are used as a measure of changes of electric or magnetic force on the tip; or, the tip can be placed on the surface with no vibration to measure directly the profile of the surface.

It is still another object of this invention to provide a stand-alone atomic force microscope which can be placed on or suspended over the surface of large samples to scan local areas of the surface.

It is yet another object of this invention to provide a sensor for use in an atomic force microscope which sensor is small enough to be mounted in the scanner so that the sensor can be scanned over a sample and the sample can be stationary.

Other objects and benefits of the invention will become apparent from the detailed description which follows hereinafter when taken in conjunction with the drawing figures which accompany it.

SUMMARY

The foregoing objects have been achieved by the compact, stand-alone atomic force microscope of this invention which is adapted for placement directly onto or over a surface of a large sample to be scanned and having a sensing tip mounted for vertical movement in response to horizontal raster scan movement of the sensing tip over a local scan area of the sample's surface comprising, an independently novel sensing unit comprising, a mounting member,
a lever arm carried by the mounting member at one end of the arm, the arm having the sensing tip disposed at an opposite end thereof,
a reflective surface carried by the arm adjacent the sensing tip, a laser diode having light-emitting faces on opposite sides thereof, the laser diode being carried by the mounting member and disposed close adjacent the sensing tip with one of the faces facing the reflective surface to emit a laser light beam therefrom and receive a portion of the light beam reflected from the reflective surface thereon, and laser power detector means disposed close adjacent and facing the other of the faces of the laser diode for receiving laser light thereon and for outputting an electrical signal directly related to the power of the laser light whereby the electrical signal can be used to measure the profile and physical properties of the sample surface.

In one embodiment, there is a body having top and bottom ends; scan tube means for creating raster scan movement carried by the body and having a surface carrying the sensing unit with the sensing tip facing the sample; support means for supporting the body on or over the surface of the large sample; and, vertical position adjustment means for adjustably changing the position of the sensing tip with respect to the surface of the large sample.

In the preferred embodiment, the body is a vertically-oriented, hollow, cylinder and the scan tube means is carried by the top end of the body vertically and concentrically disposed within the body. The scan tube can provide both horizontal and vertical movement of the sensing tip. Vertical movement can also be provided by a piezoelectric mounting member for the lever arm and/or a vertically adjustable support for the sample.

In the preferred embodiment, the electrical signal output by the laser power detector means varies as a function of a phase relationship between the emitted laser light and the reflected laser light. Also, offset creating means are connected to the lever arm for moving the relative position of the lever arm with respect to the face of the laser diode as a function of an electrical signal applied thereto. Preferably, the offset creating means comprises a piezoelectric bimorph carrying the lever arm at an end thereof opposite the sensing tip. Computer control means are connected to the offset creating means for adjusting the position of the lever arm to an operating point where the laser output is most sensitive to motion of the lever arm. In an alternate version without the offset creating means, the sensitive operating point is established by using the scan tube and/or an adjustable support for the sample to press the sensing tip against the sample and thereby bend the lever arm and change the distance between the lever arm and the face of the laser diode. In such case, the computer control means is connected to drive the scan tube and/or an adjustable support for the sample to effect the desired results. The preferred computer control means also includes means for causing the lever arm to be bent by multiples of ¼ of the wavelength of the laser light to use equivalent operating points producing higher forces on the sensing tip.

In an alternate approach, piezoelectric vibrational force creating means are connected to the lever arm for applying a vibrating force on the lever arm tending to vibrate the sensing tip up and down with respect to a surface of a sample being scanned in response to an electrical signal applied thereto. The preferred piezoelectric vibrational force creating means also comprises a piezoelectric bimorph carrying the lever arm at an end thereof opposite the sensing tip and the vibrational force creating means can also function as the offset creating means.

For increased sensitivity, the lever arm including the sensing tip and the laser diode can be formed as an integrated structure.

DESCRIPTION OF THE DRAWINGS

FIG. 1 is a simplified drawing of portions of a prior art atomic force microscope employing a laser beam deflected by vertical movement of the tip of a scanning lever arm.

FIG. 2 is an enlarged simplified drawing of the scanning portion of an atomic force microscope according to the present invention showing the manner of operation thereof.

FIG. 3 is a graph of the power output of the diode laser employed in the scanning portion of FIG. 2 as a function of the distance from the reflecting surface of the scanning tip of the lever arm to the adjacent face of the laser diode.

FIG. 6 is a simplified, partially cutaway side view of a stand-alone force microscope according to the present invention in one embodiment thereof shown placed on the surface of a large sample so as to scan a local area thereof.

FIG. 7 is a simplified, partially cutaway side view of the stand-alone atomic force microscope of FIG. 6 showing how it can be used to scan a small sample held by a sample holder upon which the microscope rests.

FIG. 9 is a simplified, partially cutaway side view showing how the novel sensor of the present invention can be mounted in a scan tube which is suspended over a sample so as to scan a local area thereof.

FIG. 10 is an enlarged simplified drawing of the scanning portion of an atomic force microscope according to the present invention in an alternate embodiment thereof wherein the lever arm and laser diode are separately mounted.

DESCRIPTION OF THE PREFERRED EMBODIMENT

Figure 5:
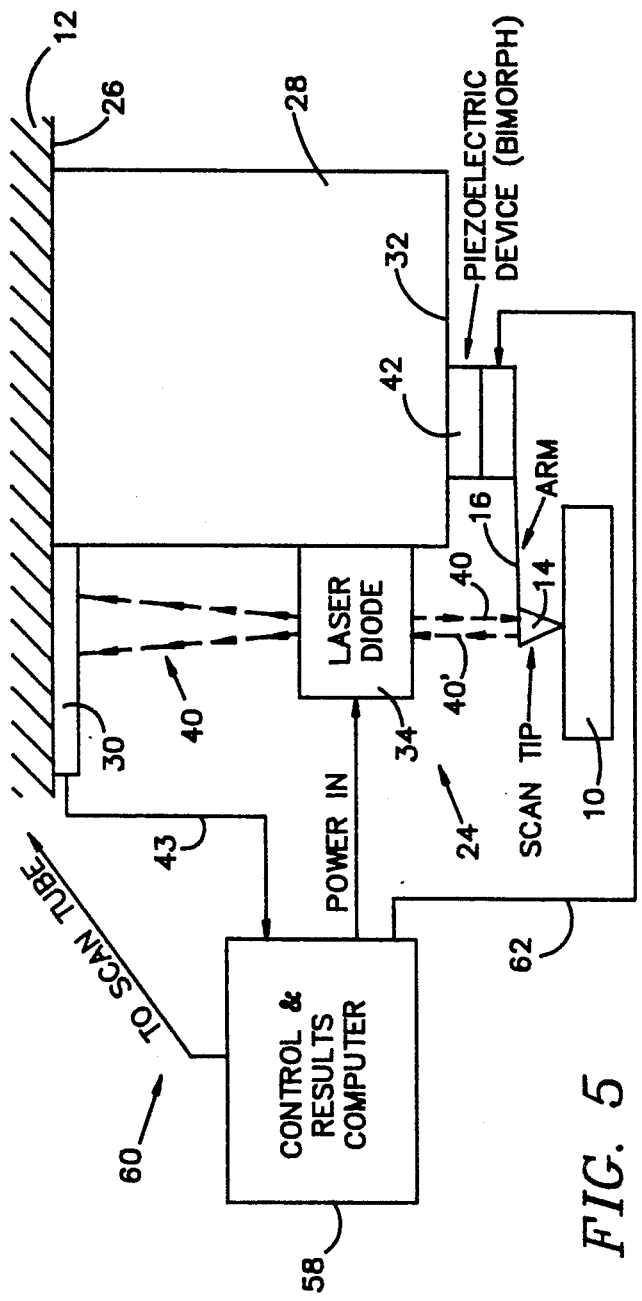
FIG. 5 is a functional block diagram of an atomic force microscope system according to the present invention in its preferred embodiment and incorporating an alternate embodiment of the scanning portion of FIG. 2.

In the drawing figures of the microscope of the present invention and the novel sub-assemblies thereof which are now to be described in detail, those components which are similar in structure to those of the prior art microscope of FIG. 1 are labelled with like numbers for convenience. Also, those components that are well known in the art and their method of operation are not described in any detail in the interest of simplicity and the avoidance of redundance. Finally, while the sample is depicted and described as being on top of a horizontal support and the scanning tip is moved vertically with respect to the sample's surface as the sample is scanned in a horizontal raster scanning pattern, since the sample is usually adhesively attached to its support for stability in the scanning process those skilled in the art will readily recognize that the terms "horizontal" and "vertical" are only relative terms of convenience and the sample could be mounted at other angles without affecting the operation of the present invention. It is, therefore, the inventors' intent and expectation that the breadth accorded the invention will be in accordance with the scope and spirit of the disclosure and not be limited by the use, for convenience only, of particular examples and language.

The sensing portion of an atomic force microscope according to the present invention is depicted in simplified form in FIG. 2 wherein it is generally indicated as 24. As will be described in greater detail hereinafter, the sensing portion 24 is mounted to the top surface 26 of top-mounted and downward-facing scan tube 12 and comprises a mounting member 28 having a laser power detector 30 (of any type well known to those skilled in the art for such purposes) extending outward horizontally adjacent the top surface 26 and a cantilevered arm 16 with a sensing tip 14 on the outer end thereof extending outward horizontally from the opposite (i.e. bottom) surface 32 of the mounting member 28. A laser diode 34 is carried by the mounting member 28 on the side thereof adjacent the bottom surface 32 above the tip 14 and below the detector 30. The laser diode 34 and tip 14/arm 16 are an integrated structure (made by integrated circuit fabricated techniques well known to those skilled in the art) where the back 36 of the arm 16 or tip 14 is of the order of microns or tens of microns away from the front face 38 of the laser diode 34. While it is felt by the inventors herein that the integrated structure of FIG. 2 may give better sensitivity to the sensing portion 24, a non-integrated approach such as that shown in FIG. 10 wherein the arm 16 and laser diode 34 are mounted on separate mounting members 28 could be employed if preferred. Also, it should be pointed out that the laser power detector 30 is shown as a separate entity only for ease of understanding and convenience. It may be possible to build the detector 30 into the structure of the laser diode 34 according to present fabrication techniques or techniques presently under development. In such case, it would be preferred to employ such a unitary device in place of the separate components in order to improve sensitivity. In this regard, it should be pointed out that the use of a laser diode in combination with a power detector for measuring purposes is not a point of novelty of this invention—only their use as part of a sensor for use in microscope applications.

The back 36 of the arm 16 (and or the tip 14) is reflective and is positioned during manufacture about 10 microns from the front face 38 of the laser diode 34. As is known in the art, a solid state laser comprises a cavity in which light is generated and made to reflect from end to end. Gain is added to the cavity such that the energy of the reflected light continues to increase until the device "lases", i.e. the energy of the light is sufficient to pass through the reflective surface rather then continue to be reflected back into the cavity therefrom. Operating in this fashion, the laser diode 34 emits a beam of laser light 40 from its front face 38 onto the reflective back 36. The light 40' which reflects off the arm 16 back into the laser diode 34 adds to the light 41 being reflected internally from the front face 38 in a manner which depends on the phase of the reflected light 40'. The light 40' from the arm 16 can add either constructively or destructively with the internally reflected light 41 and this will vary as the distance between the arm 16 and front face 38 of the laser diode 34 varies. The light power output of the laser diode 34 (e.g. from the opposite face 39) will vary as the phase of the reflected light 40' is varied, as shown in FIG. 3. When the light 40' reflected from the arm 16 is in-phase with the light 41 reflected from the front face 38 of the laser diode 34, the laser diode's output from face 39 will be a maximum and when the light 40' from the arm 16 is out-of-phase, the laser's output will be a minimum. If the arm 16 is moved one-quarter of a wavelength of the laser light 40, either toward or away from the front face 38 of the laser diode 34, the output will vary from a maximum to a minimum as depicted in the figure. Using this phenomenon of the sensing portion 24, vertical motion of the arm 16 can be detected by monitoring the changes in the laser's output power as sensed by the detector 30. A motion of the arm 16 one-quarter wavelength of the light 40 moves the power from a maximum to a minimum. This distance is about 200 nanometers. To obtain 0.1 nanometer resolution, one wants the difference between the maximum and minimum power to be, percent-wise, as large as possible. In the preferred (and tested) embodiment of the sensing portion 24 as depicted in FIG. 2, with the laser diode 34 and arm 16 being very close together and without windows between the arm 16 and laser diode 34, the inventors herein have obtained up to a 90% modulation of the laser's power, enough to be able to obtain resolution in the 0.1 nanometer range.

Figure 4:
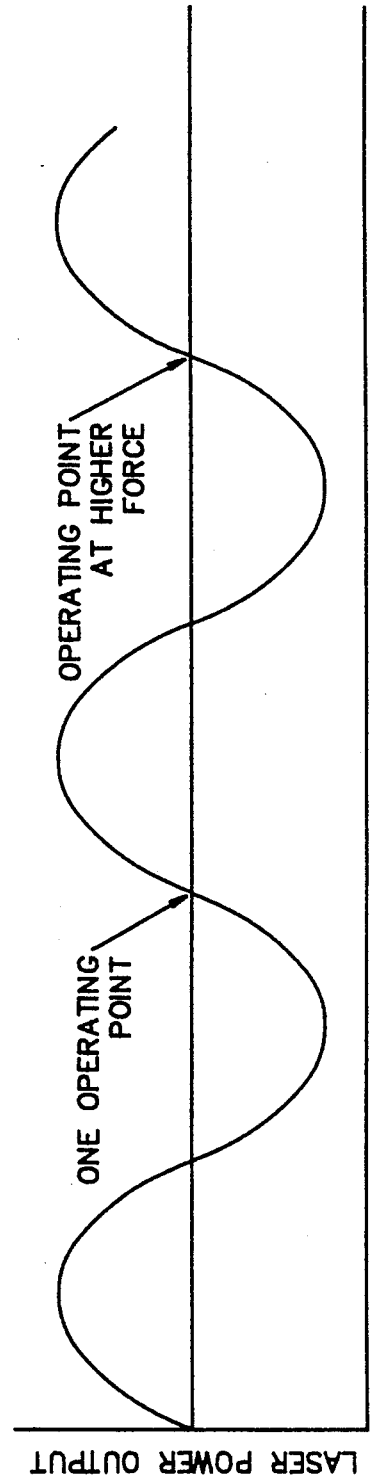
FIG. 4 is a graph of the power output of the diode laser employed in the scanning portion of FIG. 2 as a function of the bending of the lever arm.

As will be readily recognized and understood by those skilled in the art, the output power is most sensitive to motion of the arm 16 at points which are halfway between the maximum and minimum power points, as labelled in FIG. 3. Thus, it is preferred that the sensing portion 24 be set to operated at one of these most sensitive operating points before scanning takes place. The sensitive operating points can be achieved, independent of the phase of the reflected light 40' when there is no load on the arm 16, by pushing the point of the tip 14 onto the sample 10 (and/or pushing the sample 10 against the tip 14) so as to bend the arm 16 until one of these preferred regions on the intensity curve is found. The maximum distance the arm 16 would need to be bent to reach one of these operating regions would be one-quarter wavelength, or about 200 nanometers. A typical spring constant for the arm 16 is one newton/miter, so that the most force that would need to be applied to the tip 14 to reach the first operating point would be 1 nt/m $\times$ 200 $10^{-9}$m = 2 $\times$ $10^{-7}$ nt, which is an acceptable force for many samples. This operating force could be lowered by using an arm 16 with a lower spring constant such as 0.2 nt/nm, which the inventors herein have found from prior experience is not difficult to construct. If more force is required, the tip 14 could be pressed against the sample harder (thereby bending the lever arm 16 more) to reach an equivalent operating point, as shown in FIG. 4, but at a larger force. To operate at the preferred points of maximum sensitivity with the least amount of bending force on the arm 16, the mounting of the arm 16 could be pivoted so as to adjust the position of the arm 16 with respect to the laser diode 34 in a manner to be described in detail hereinafter.

As is well known to those skilled in the art, each atomic force microscope includes a system computer (not shown in FIG. 2 for convenience) which drives the scan tube 12 in its scanning functions and which also inputs the data about the positioning of the tip 14 on the sample 10 and provides meaningful output information therefrom. With an atomic force microscope employing the sensing portion 24 as described above, the system computer could easily sense (from the signal output on wires 43 from the detector 30) whether the operating point has a positive or negative slope of intensity versus distance and could operate the system's feedback electronics appropriately. Once the operating point is found, the system can scan the tip 14 across the sample 10 or the sample 10 across the tip 14 to determine the topography of the surface. This could be done by holding the height of the sensor portion 24 constant and detecting the changes in the height of the tip 14 as determined from the intensity of the signal from the detector 30. This is called the deflection mode. In this mode, the height of objects which could be scanned over would need to be less than about ⅛ of a wavelength of the light 40, or about 100 nanometers; otherwise the sensor portion 24 would move far away from the sensitive operating point and would not be able to measure heights well.

Another mode is the constant force mode in which the deflection of the arm 16, and therefore the intensity signal from the detector 30, is kept essentially constant by using the signal from the detector 30 in a feedback loop to control (with the scan tube 12) the vertical height of the sample 10- or the sensor portion 24 (depending on which is being scanned with respect to the other) to compensate for the topography over which the tip 14 is being scanned. In this mode, the deflection of the arm 16 is very slight with the feedback loop attempting to keep the changes to zero. These modes of operating, per se, are used with scanning tunneling microscopes and are, of course, well known in the art.

FIG. 5 shows an alternate embodiment of the integrated sensor portion 24 as incorporated into a preferred atomic force microscope system according to the present invention. As can be seen, there is a control and results computer 58 connected to the various components to drive the system and obtain the data therefrom. The computer 58 includes the specialized logic to accomplish the unique functions of this invention as are being described herein. The computer 58, per se, is not novel; however, its novel functional aspects as they relate to the operation of the atomic force microscope being described herein are considered to be novel. In this embodiment, the arm 16 is mounted on a piezoelectric device 42 which (upon application of an appropriate voltage signal from the computer 58 on line 62) can move the tip end of the arm 16 with respect to the laser diode 34 so that (as mentioned above) the sensitive operating point for the sensor portion 24 can be set independently without pressing the tip 14 against the sample 10 as with the previously described embodiment. This allows the force on the tip 14 to be set at any value and to also set the operating point at the most sensitive point. The inventors herein have found that a bimorph piezoelectric element (i.e., two piezoelectric slabs joined together) makes a satisfactory device 42 for moving the arm 16, as depicted in FIG. 5. The piezoelectric device 42 needs to be able to move the tip end of the arm 16 about one wavelength of the light 40, (or about one micron) so that the most sensitive operating point can be found when there is no force on the tip 14. The tip 14 can then be brought down onto the sample 10 with a very small force; the force being measured by the defection of the arm 16 about the null point. In this embodiment, the bending of the arm 16 could be toward the sample 10, i.e. the net force on the tip 14 could be attractive, bending the arm 16 toward the sample 10. This would be the situation when one is using, for instance, an etched nickel tip to measure either magnetic or electric fields near the surface of the sample 10.

In a non-contacting mode of operation with this embodiment, the piezoelectric device 42 can be used by the computer 58 to vibrate the arm 16 near its resonant frequency. Force gradients on the tip 14 due to Van der Walls forces, magnetic forces, or electric forces near the surface will change the resonant frequency and, therefore, the amplitude of the vibrations will vary for the same piezoelectric device 42 because the resonant frequency will shift either toward or away from the drive frequency of the piezoelectric device 42. The amplitude of vibrations will increase when the resonant frequency moves toward the drive frequency and, correspondingly, will decrease when the resonant frequency moves away from the drive frequency. The feedback system 60 can move the tip or sample vertically to keep the amplitude of vibrations constant and therefore the force gradient on the tip 14 constant. Thus, data regarding the vertical motion can be employed by the computer 58 to give information about the topography, the electric fields, or the magnetic fields near the surface.

For measuring large samples, the sensor portion 24 of this invention (in either of its two described embodiments can be mounted into a stand-alone structure as shown in FIG. 6 to create a novel and compact atomic force microscope 44. The compact atomic force microscope 44 of this invention in this particular embodiment comprises a vertically-oriented, cylindrical body 46 having three feet 49 on the bottom, which rest on the sample 10 and can be adjusted vertically by knobs 50 to move the tip 14 toward or away from the surface of the sample 10. This was done in tested embodiments with the feet 48 being mounted on screws 52 connected to the knobs 50 so as to be rotated thereby to move the feet 48 up and down with respect to the bottom of the body 46. It is anticipated that in a commercial embodiment, the knobs 50 could be moved in unison or individually by an appropriate mechanical drive under the control of the computer 58 so as to accurately raise and lower the tip 14 as well as change the angular orientation thereof. The preferred feet 48 are balls or portions of balls which can be steel or glass. There is no need for the feet 48 to be electrically conducting since the sensor portion 24 does not need an electrical current to flow from the detector 22 to the sample 10 as is required in scanning tunneling microscopes to effect operation thereof. The sensor portion 24 hangs from the top-mounted and downward-facing scan tube 12 (in the manner of FIG. 2) which can be concentrically located within the body 46 for ease of manufacture and assembly. While the cylindrical embodiment shown in preferred, it will be recognized and appreciated that, if desired, the body 46 could be configured as a block with the sensing portion 24 carried by a scan tube 12 attached to an outer surface to position the sensing portion 24 at a bottom edge of the body 46 with the tip 14 located between a pair of spaced first feet and with a single, vertically adjustable, second foot located between the first feet and opposite the sensing portion 24. In such an embodiment, the tip 14 could be raised and lowered by lowering and raising the second foot to rock the body 46 on the first feet. Such an embodiment would also allow the tip 14 to be positioned accurately using an optical lens, which could be separate or carried by the body 46. In yet another variation, the supporting feet 48 could be fixed and the attachment of the scan tube 12 to the top 56 of the body 46 at 64 could be made vertically adjustable so that the tip 14 could be raised and lowered by raising and lowering the scan tube 12 with respect to the body 46.

Figure 8:
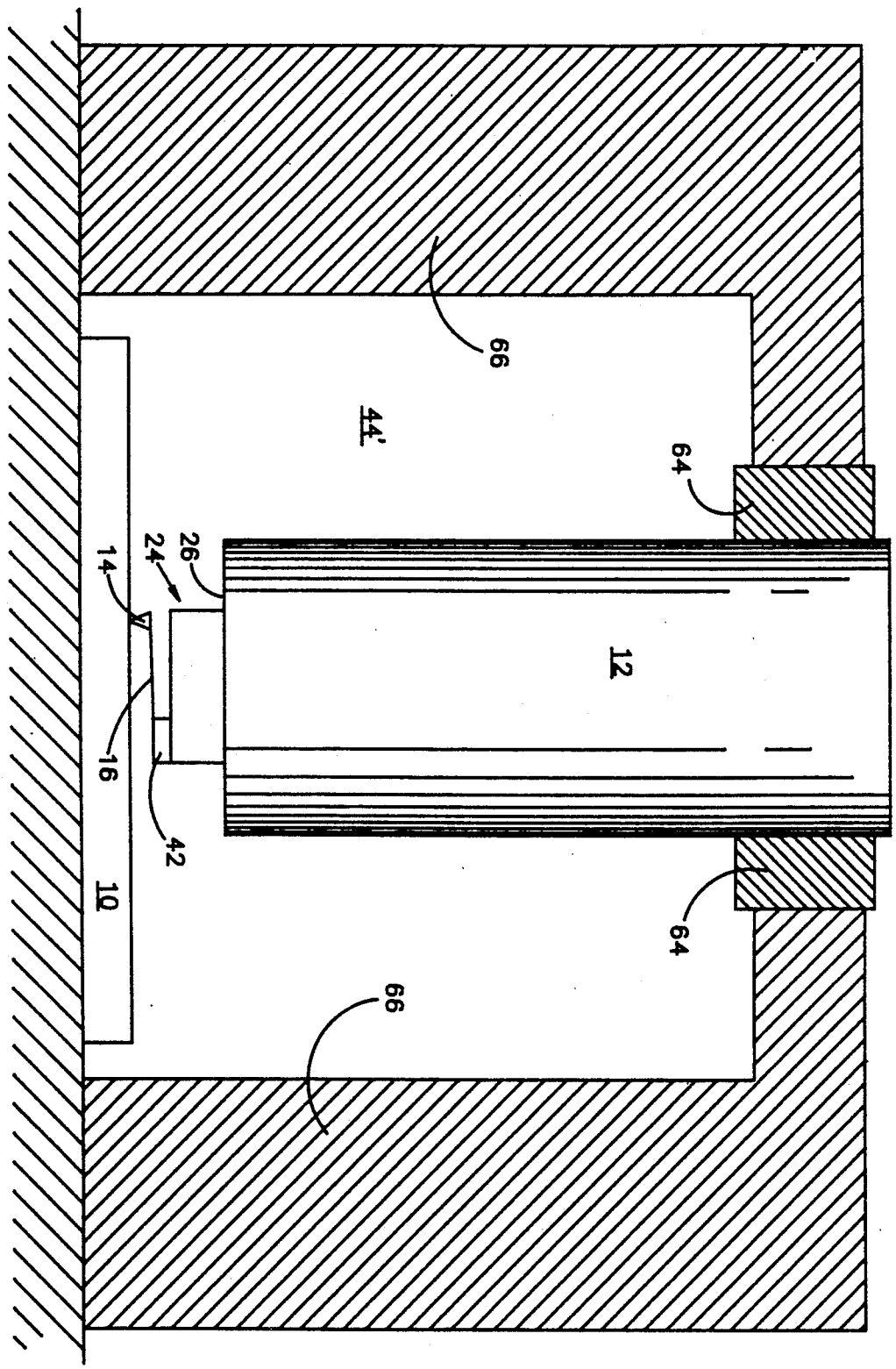
FIG. 8 is a simplified, partially cutaway side view of a stand-alone atomic force microscope according to the present invention in another embodiment thereof shown placed on a supporting surface and straddling a large sample so as to scan a local area thereof.

As will instantly be appreciated by those skilled in the art, the compact atomic force microscope 44 can be placed on large structures such as mirrors or lenses to investigate the surface finish thereof at selected locations by the local scanning of the sensing portion 24 and scan tip 14 over the surface by the scan tube 12. The compact atomic force microscope 44 (or "stand-alone microscope" as the inventors have referred to it) can rest on the sample 10 and be moved around over the sample 10; or, for small samples, can rest on a flat sample holder 54 as depicted in FIG. 7. In this configuration, the sample 10 is connected to the sample holder 54; but, is smaller than the spacing between the feet 48 so that the compact atomic force microscope 44 can be moved around on the holder 54 and the tip 14 placed over specific areas of the sample 10 for scanning thereof. This structure could be quite large so that objects such as optical disks or integrated circuit wafers could be scanned without the feet 48 contacting the sample 10. For example with reference to FIG. 8, the stand-alone microscope 44' could employ large legs 66 supporting the scan tube 12 and sensing portion 24 from the top so as to simply straddle large samples. Yet another possible implementation of an atomic force microscope according to the present invention is shown in FIG. 9 where it is generally indicated as 44". The unique sensing portion 24 of this invention is small enough to be mounted ian the end of a standard scan tube 12 to make an integrated scanning and sensing structure 68. All that is required to implement the structure 68 as a microscope is some means of supporting the sensing portion 24 over a sample 10 to be scanned. In its simplest form, this could be simply a sturdy support arm 70, as shown in FIG. 9, which firmly grips the scan tube 12 at its top end, leaving the bottom end (carrying the sensing portion 24) free to move horizontally and vertically as necessary to operate in the manner desired in the particular application. The sample 10 could be mounted to a support 72. All vertical movement could be accomplished by the scan tube 12; or, as is preferred, the support 72 could be vertically moveable and adjustable as indicated by the arrows 74. In a preferred operational scenario, the scan tube 12, the sensing portion 24, the piezo device 42, and the support 72 are all controlled by the computer 58. The computer 58 first lowers the support 72 for placement of the sample 10 thereon and uses the piezo device 42 to position the lever arm 16 at one of the maximum sensitivity points. The support 72 is then raised until sensed deflection of the arm 16 indicates contact with the sample 10 by the tip 14. The scan tube 12 is then employed to move the sensing portion 24 to scan the sample 10 and generate data about the surface of the sample 10 in the scanned area.

Thus, it can be seen from the foregoing description and the accompanying drawings that, in general, the present invention is compact atomic force microscope based on a small integrated force sensor using optical interference by having a laser beam from a laser diode reflect off the flexible arm holding the tip back into the laser diode to affect the output of the laser diode and then use this output to measure the position of the arm. In an alternate embodiment, the arm is mounted to a piezoelectric device which can be employed to effect an offset to the arm to place it in a preferred signal-generating configuration; or, can be employed to vibrate the arm for use in a non-contacting mode of operation. The novel sensor design is small enough that it can be built into the scanner so that the sensor can be scanned over a stationary sample.

Wherefore, having thus described our invention, what is claimed is:

1. In an atomic force microscope having a sensing tip mounted for vertical movement in response to relative horizontal movement of the sensing tip across a sample surface, apparatus for sensing vertical movement of the sensing tip and for outputting a signal reflecting characteristics of the sample surface related to vertical movement of the sensing tip comprising:
   a) a reflective surface carried by the sensing tip;
   b) a laser diode having a light-emitting face disposed close adjacent the sensing tip with said face facing said reflective surface to emit a laser light beam therefrom and receive a portion of said light beam reflected from said reflective surface thereon to thereby affect the power output of said laser diode from another face of said laser diode; and,
   c) laser power detector means disposed for receiving laser light from said laser diode and for outputting an electrical signal directly related to the power of said laser light whereby said electrical signal is also directly related to movement of the sensing tip relative to said face of said laser diode and can be used to measure the profile and physical properties of the sample surface.

2. The sensing and signal outputting apparatus for use with an atomic force microscope of claim 1 wherein:
   a) said laser diode has light-emitting faces on opposite sides thereof with one of said faces facing said reflective surface; and,
   b) said laser power detector means is disposed close adjacent and facing the other of said faces.

3. The sensing and signal outputting apparatus for use with an atomic force microscope of claim 1 wherein:
   said electrical signal output by said laser power detector means varies as a function of a phase relationship between said emitted laser light and said reflected laser light.

4. The sensing and signal outputting apparatus for use with an atomic force microscope of claim 1 wherein:
   the sensing tip is carried by the end of a lever arm and said reflective surface is disposed on a surface of said lever arm.

5. The sensing and signal outputting apparatus for use with an atomic force microscope of claim 4 and additionally comprising:
   electrically operated offset means connected to said lever arm for moving said reflective surface towards and away from said face of said laser diode to change the spacing therebetween.

6. The sensing and signal outputting apparatus for use with an atomic force microscope of claim 5 wherein:
   said electrically operated offset means comprises a piezoelectric bimorph carrying said lever arm at an end thereof opposite the sensing tip.

7. The sensing and signal outputting apparatus for use with an atomic force microscope of claim 5 and additionally comprising:
   computer control means connected to said electrically operated offset means for adjusting the spacing between said reflective surface and said face of said laser diode until a change in said electrical signal output by said laser power detector means indicating light output intensity from said laser diode versus the distance between said face and said reflective surface is near a maximum sensitivity point and for then scanning the sensing tip over said surface while keeping intensity constant at said maximum sensitivity point by changing the position of the laser diode relative to said surface of said sample as the sensing tip is scanned relative to said sample.

8. The sensing and signal outputting apparatus for use with an atomic force microscope of claim 5 and additionally comprising:
   computer control means connected to said electrically operated offset means for prior to scanning adjusting a force forcing the sensing tip onto said surface of said sample to bend said lever arm and thereby adjust the spacing between said reflective surface and said face of said laser diode until a change in said electrical signal output by said laser power detector means indicating light output intensity from said laser diode versus the distance between said face and said reflective surface is near a maximum sensitivity point and for then maintaining said force while scanning the sensing tip over said surface.

9. The sensing and signal outputting apparatus for use with an atomic force microscope of claim 8 wherein:
   said computer control means includes means for increasing said force so as to bend said lever arm by multiples of ¼ of the wavelength of said laser light to use equivalent operating points producing higher forces on the sensing tip.

10. The sensing and signal outputting apparatus for use with an atomic force microscope of claim 4 and additionally comprising:
    piezoelectric vibrational force creating means connected to said lever arm for applying a vibrating force on said lever arm tending to vibrate the sensing tip up and down with respect to a surface of a sample being scanned in response to an electrical signal applied thereto.

11. The sensing and signal outputting apparatus for use with an atomic force microscope of claim 10 wherein:
    said piezoelectric vibrational force creating means comprises a piezoelectric bimorph carrying said lever arm at an end thereof opposite the sensing tip.

12. The sensing and signal outputting apparatus for use with an atomic force microscope of claim 1 wherein:
    a) the sensing tip is carried by the end of a lever arm and said reflective surface is disposed on a surface of said lever arm; and,
    b) said lever arm and said laser diode in combination with said laser power detector means are mounted together and comprise a sensing unit; and additionally comprising,
    c) scan tube means for creating transverse raster scan movement and longitudinal movement carrying said sensing unit and in combination therewith forming a unitary scanning and sensing unit.

13. The sensing and signal outputting apparatus for use with an atomic force microscope of claim 12 and additionally comprising;
    supporting apparatus for supporting said unitary scanning and sensing unit over a sample surface to be scanned.

14. The sensing and signal outputting apparatus for use with an atomic force microscope of claim 13 wherein said supporting apparatus comprises:
    a) a body having a top end and a bottom end, said unitary scanning and sensing unit being carried by said top end with the sensing tip facing downward;
    b) support means carried by said bottom end for supporting said body on a horizontal surface; and,
    c) vertical position adjustment means for adjustably raising and lowering the position of the sensing tip with respect to said horizontal surface whereby said body can be placed on large samples to measure surface topography thereof.

15. The sensing and signal outputting apparatus for use with an atomic force microscope of claim 14 wherein:
    a) said support means comprises three screws threadedly engaged through said body between said top and bottom ends and having supporting feet on bottom ends thereof; and,
    b) said vertical position adjustment means comprises griping knobs on top ends of said screws whereby by manually turning said knobs and screws in combination said body can be made to move up and down.

16. The sensing and signal outputting apparatus for use with an atomic force microscope of claim 14 wherein:
    a) said support means comprises supporting feet disposed on said bottom end of said body; and,
    b) said vertical position adjustment means comprises adjustable means attaching said scan tube means to said body whereby said scan tube means can be moved up and down with respect said body.

17. A compact, stand-alone atomic force microscope adapted for placement directly onto or suspending over a surface of a sample to be scanned and having a sensing tip mounted for vertical movement in response to horizontal raster scan movement of the sensing tip over a local scan area of the sample's surface comprising:
    a) a sensing unit comprising,
    a1) a mounting member,
    a2) a lever arm carried by said mounting member at one end of said arm, said arm having the sensing tip disposed at an opposite end thereof,
    a3) a reflective surface carried by said arm adjacent the sensing tip,
    a4) a laser diode having a light-emitting face being carried by said mounting member and disposed close adjacent the sensing tip with said face facing said reflective surface to emit a laser light beam therefrom and receive a portion of said light beam reflected from said reflective surface thereon to thereby affect the power output of said laser diode from another of said laser diode, and
    a5) laser power detector means disposed for receiving laser light from said laser diode thereon and for outputting an electrical signal directly related to the power of said laser light whereby said electrical signal is also directly related to movement of the sensing tip relative to said face of said laser diode and can be used to measure the profile and physical properties of the sample surface;
    b) a body having top and bottom ends;
    c) scanner means for creating transverse scan movement and longitudinal movement carried by said body and having a transverse bottom surface carrying said sensing unit with the sensing tip facing longitudinally;

d) support means attached to said body for supporting said body over the surface of the sample; and, c) vertical position adjustment means for adjustably changing the distance between the sensing tip and the surface of the sample.

18. The atomic force microscope of claim 17 wherein:
a) said support means comprises three screws threadedly engaged through said body between said to and bottom ends and having supporting feet on bottom ends thereof; and,
b) said vertical position adjustment means comprises means for rotating said screws whereby said body can be made to move up and down.

19. The atomic force microscope of claim 17 wherein:
a) said support means comprises supporting feet disposed on said bottom end of said body; and,
b) said vertical position adjustment means comprises adjustable means attaching said scan tube means to said body whereby said scan tube means can be moved up and down with respect said body.

20. The atomic force microscope of claim 17 wherein: said electrical signal output by said laser power detector means varies as a function of a phase relationship between said emitted laser light and said reflected laser light.

21. The atomic force microscope of claim 17 and additionally comprising:
electrically operated offset means connected to said lever arm for moving said reflective surface towards and away from said face of said laser diode to change the spacing therebetween.

22. The atomic force microscope of claim 21 and additionally comprising:
computer control means connected to said electrically operated offset means for adjusting the spacing between said reflective surface and said face of said laser diode until a change in said electrical signal output by said laser power detector means indicating light output intensity from said laser diode versus the distance between said face and said reflective surface is near a maximum sensitivity point and for then scanning the sensing tip over said surface while keeping intensity constant at said maximum sensitivity point by changing the position of the laser diode relative to said surface of said sample as the sensing tip is scanned relative to said sample.

23. The atomic force microscope of claim 21 and additionally comprising:
computer control means connected to said electrically operated offset means for prior to scanning adjusting a force forcing the sensing tip onto said surface of said sample to bend said lever arm and thereby adjust the spacing between said reflective surface and said face of said laser diode until a change in said electrical signal output by said laser power detector means indicating light output intensity from said laser diode versus the distance between said face and said reflective surface is near a maximum sensitivity point and for then maintaining said force while scanning the sensing tip over said surface.

24. The atomic force microscope of claim 23 wherein: said computer control means includes means for increasing said force so as to bend said lever arm by multiples of $\frac{1}{4}$ of the wavelength of said laser light to use equivalent operating points producing higher forces on the sensing tip.

25. The atomic force microscope of claim 17 and additionally comprising:
piezoelectric vibrational force creating means connected to said lever arm for applying a vibrating force on said lever arm tending to vibrate the sensing tip up and down with respect to a surface of a sample being scanned in response to an electrical signal applied thereto.

26. In an atomic force microscope having a sensing tip mounted for vertical movement in response to relative horizontal movement of he sensing tip across a sample surface, the method of partial manufacture and operation of the microscope for sensing vertical movement of the sensing tip and for outputting signal reflecting characteristics of the sample surface related to vertical movement of the sensing tip comprising the steps of:
a) applying a reflective surface to move vertically in combination with the sensing tip;
b) mounting a laser diode having a light-emitting face adjacent the sensing tip with the face facing the reflective surface to emit a laser light beam therefrom and receive a portion of the light beam reflected from the reflective surface thereon to thereby affect the power output of the laser diode from another face of the laser diode;
c) disposing a laser power detector to receive laser light thereon from the laser diode and output an electrical signal directly related to the power of the laser light and also directly related to movement of the sensing tip relative to the surface of the laser diode;
d) scanning the sensing tip over the sample surface while operating the laser diode; and,
e) receiving the electrical signal from the laser power detector and using data therefrom to determine physical properties of the sample surface.

27. The method of claim 26 wherein said step of receiving the electrical signal from the laser power detector and using data therefrom to determine physical properties of the sample surface comprises:
using the electrical signal output by the laser power detector as an indication of a phase relationship between the emitted laser light and the reflected laser light which is directly related to movement of the sensing tip relative to the surface of the laser diode.

28. The method of claim 26 and additionally comprising the steps of:
a) adjusting the spacing between the reflective surface and the face of the laser diode until a change in the electrical signal output by the laser power detector indicating light output intensity from the laser diode versus the distance between the face and the reflective surface is near a maximum; and,
b) while scanning the sensing tip over the surface, keeping intensity constant at the maximum by changing the position of the laser diode above the surface of the sample as the sensing tip is scanned relative to the sample.

29. The method of claim 26 and additionally comprising:
a) prior to scanning, adjusting a force forcing the sensing tip onto the surface of the sample to bend a lever arm and thereby adjust the spacing between the reflective surface and the face of the laser diode until a change in the electrical signal output by the laser power detector indicating light output intensity from the laser diode versus the distance between the face and the reflective surface is near a maximum; and, b) maintaining the force while scanning the sensing tip over the surface.

30. The method of claim 29 wherein said step of forcing the sensing tip onto the surface of the sample to bend the lever arm and thereby adjust the spacing between the reflective surface and the face of the laser diode includes:

increasing the force so as to bend the lever arm by multiples of ¼ of the wavelength of the laser light to use equivalent operating points producing higher forces on the sensing tip.

31. A combined scanner/sensor for use in an atomic force microscope adapted for placement directly onto or suspension over a surface of a sample to be scanned and having a sensing tip mounted for surface characteristic-initiated movement in response to raster scan movement of the sensing tip over a local scan area of the sample's surface comprising:

a) a sensing portion comprising,
a1) mounting means,
a2) a lever arm carried by said mounting means at one end of said arm, said arm having the sensing tip disposed at an opposite end thereof,
a3) a reflective surface carried by said arm adjacent the sensing tip,
a4) a laser diode having a light-emitting face being carried by said mounting means and disposed close adjacent the sensing tip with said face facing said reflective surface to emit a laser light beam therefrom and receive a portion of said light beam reflected from said reflective surface thereon, and
a5) laser power detector means carried by said mounting means and disposed for receiving laser light from said laser diode thereon and for outputting an electrical signal directly related to the power of said laser light whereby said electrical signal can be used to measure the profile and physical properties of the sample surface; and, b) scan tube means for creating transverse raster scan movement and longitudinal movement of a bottom portion, said scan tube means having a top portion for physically connecting a support to said scan tube means and having said bottom portion carrying said mounting means with the sensing tip of said sensing unit facing longitudinally.

32. The combined scanner/sensor of claim 31 and additionally comprising:

piezoelectric means disposed between said lever arm and said mounting means for moving said reflective surface towards and away from said face of said laser diode in response to an electrical signal applied thereto whereby to change the spacing between said reflective surface and said face of said laser diode and apply vibrational forces to said lever arm.

* * * * *